US012607292B2

(12) United States Patent
Lee et al.

(10) Patent No.: US 12,607,292 B2
(45) Date of Patent: Apr. 21, 2026

(54) MOBILE TERMINAL

(71) Applicant: LG ELECTRONICS INC., Seoul (KR)

(72) Inventors: Jaehun Lee, Seoul (KR); Sanghoon Kim, Seoul (KR); Kangyeung Lee, Seoul (KR); Kukyoul Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 18/036,149

(22) PCT Filed: Nov. 10, 2020

(86) PCT No.: PCT/KR2020/015700
§ 371 (c)(1),
(2) Date: May 9, 2023

(87) PCT Pub. No.: WO2022/102798
PCT Pub. Date: May 19, 2022

(65) Prior Publication Data
US 2023/0408025 A1     Dec. 21, 2023

(51) Int. Cl.
*F16M 11/10*          (2006.01)
*G06F 1/16*           (2006.01)
(52) U.S. Cl.
CPC ......... *F16M 11/105* (2013.01); *G06F 1/1601* (2013.01); *G06F 2200/1614* (2013.01)
(58) Field of Classification Search
CPC ...... F16M 11/105; F16M 11/06; F16M 11/10; G06F 1/1601
USPC ...... 248/346.01, 346.03, 346.05, 349.1, 133, 248/134, 136, 139, 142, 144, 149, 150, 248/371, 398
See application file for complete search history.

(56) References Cited

U.S. PATENT DOCUMENTS

| | | | | |
|---|---|---|---|---|
| 8,256,725 | B2 | 9/2012 | Wang et al. | |
| 2005/0205745 | A1* | 9/2005 | Lee ...................... | F16M 11/046 248/371 |
| 2006/0110151 | A1* | 5/2006 | Sukenari ................ | H04N 1/195 396/428 |
| 2006/0196998 | A1* | 9/2006 | Matteo ................... | F16M 11/08 248/921 |

(Continued)

FOREIGN PATENT DOCUMENTS

| | | |
|---|---|---|
| JP | 2004056802 | 2/2004 |
| KR | 100684997 | 2/2007 |
| KR | 1020200050561 | 5/2020 |

OTHER PUBLICATIONS

PCT International Application No. PCT/KR2020/015700, International Search Report dated Aug. 6, 2021, 5 pages.

*Primary Examiner* — Alfred J Wujciak
(74) *Attorney, Agent, or Firm* — LEE, HONG, DEGERMAN, KANG & WAIMEY <section type="abstract">
(57)          ABSTRACT

A display device is disclosed. The display device of the present disclosure includes: a display panel; a frame to which the display panel is coupled; a stand coupled to the frame and extending long; a base spaced apart from the display panel in a longitudinal direction of the stand; and a bracket which is fixed to the base and to which the stand is rotatably coupled, wherein the stand includes a shaft fixed to the stand and rotatably coupled to the bracket, the shaft providing an axis of rotation for the stand, wherein the shaft is hollow.
</section>

14 Claims, 9 Drawing Sheets

1

(56)  References Cited

U.S. PATENT DOCUMENTS

| 2007/0040077 | A1* | 2/2007 | Baek | ..................... | F16M 11/10 |
| | | | | | 248/133 |
| 2007/0086193 | A1 | 4/2007 | Chen | | |
| 2007/0278362 | A1* | 12/2007 | Lee | ................... | F16M 11/2021 |
| | | | | | 248/133 |

* cited by examiner

[FIG. 1]
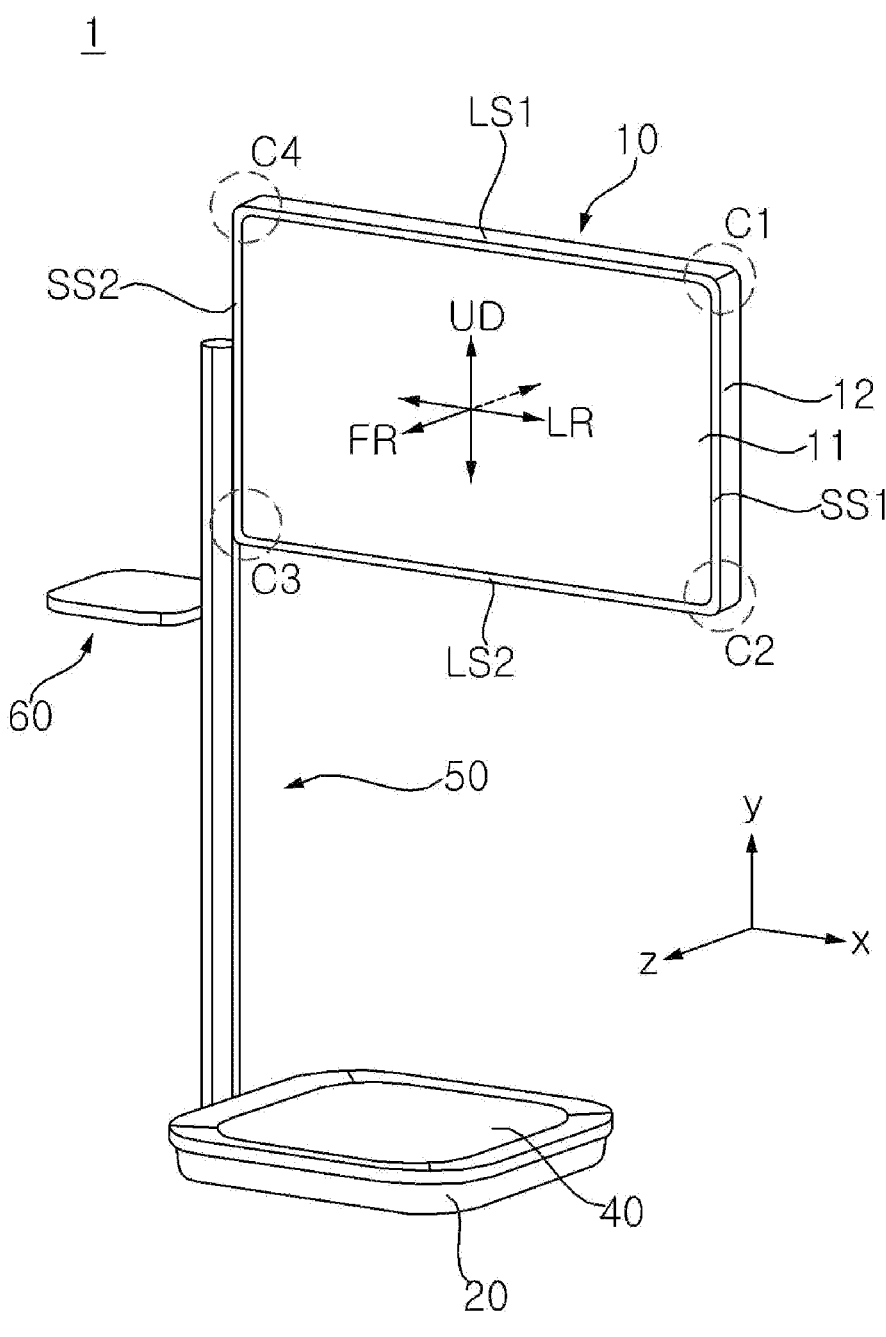

[FIG. 2]
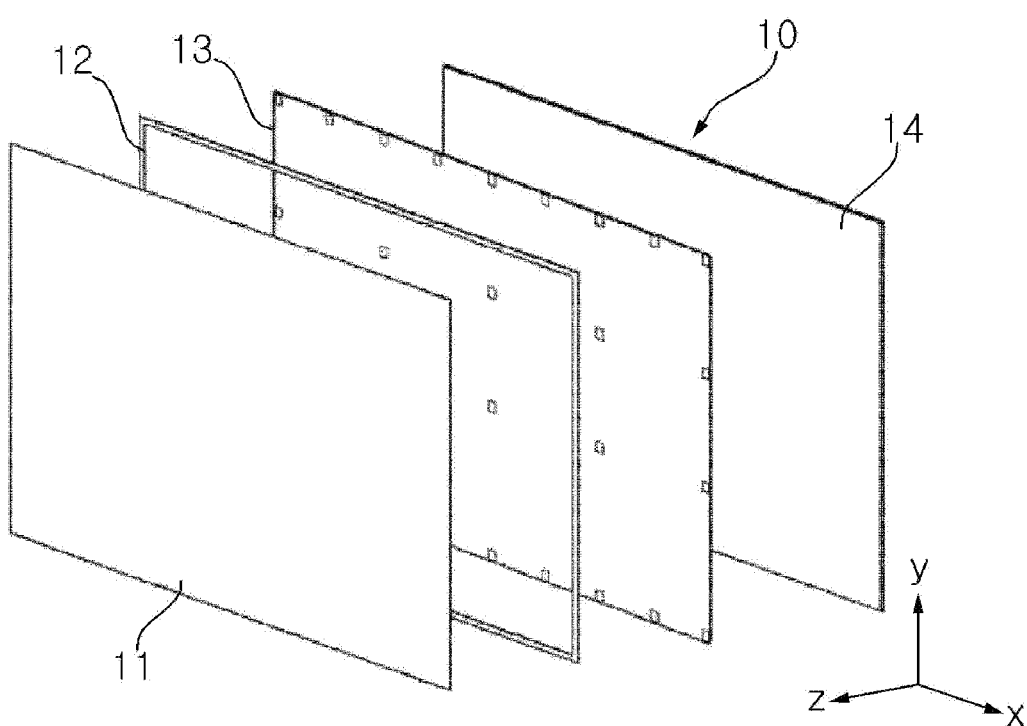

[FIG. 3]
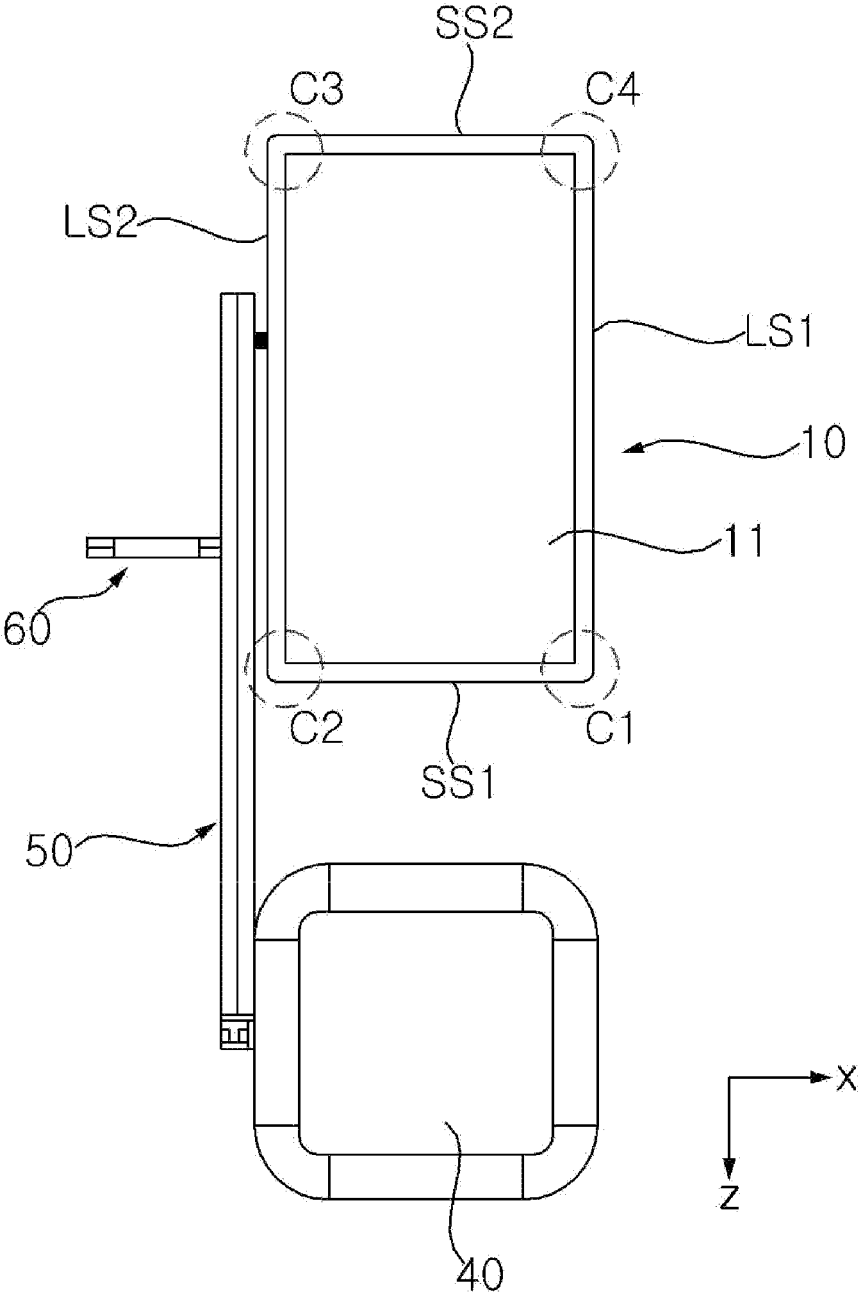

[FIG. 4]
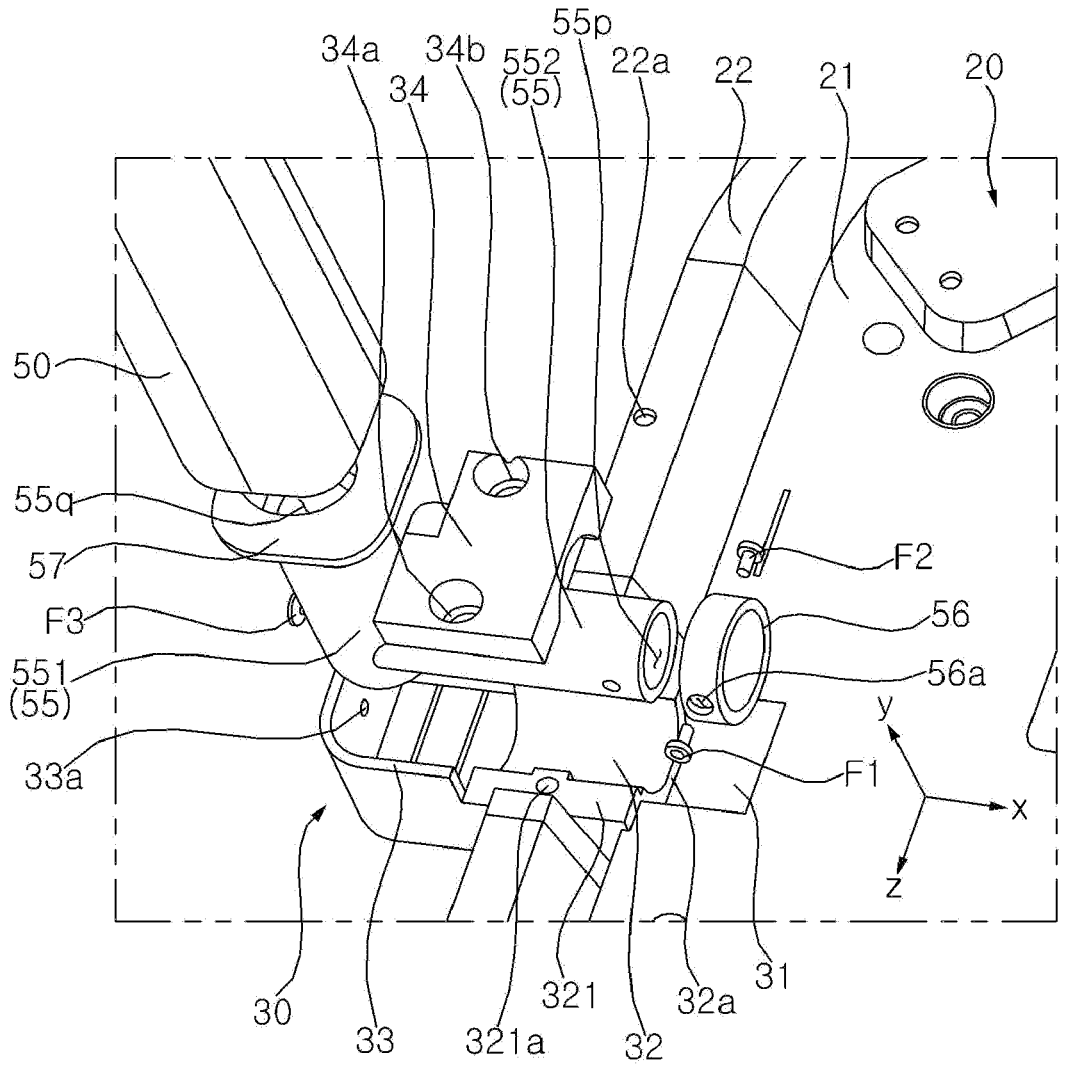

[FIG. 5]
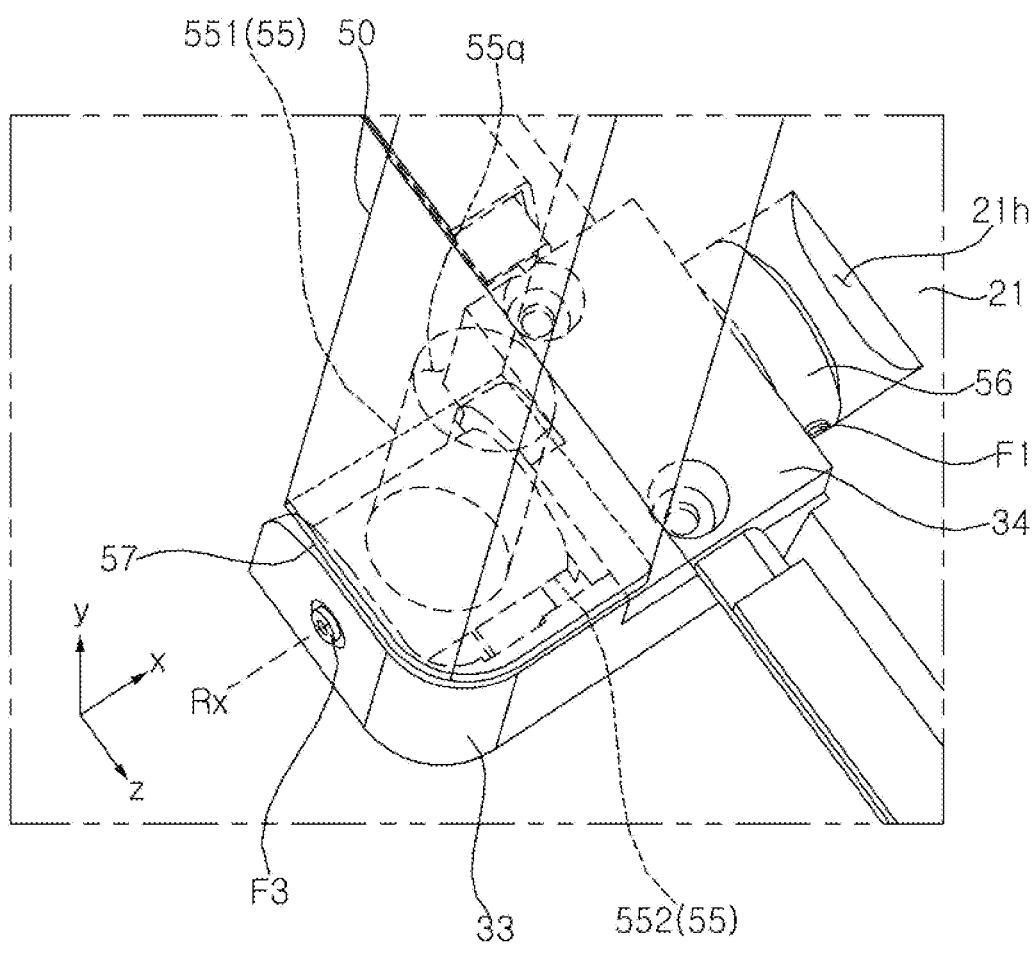

[FIG. 6]
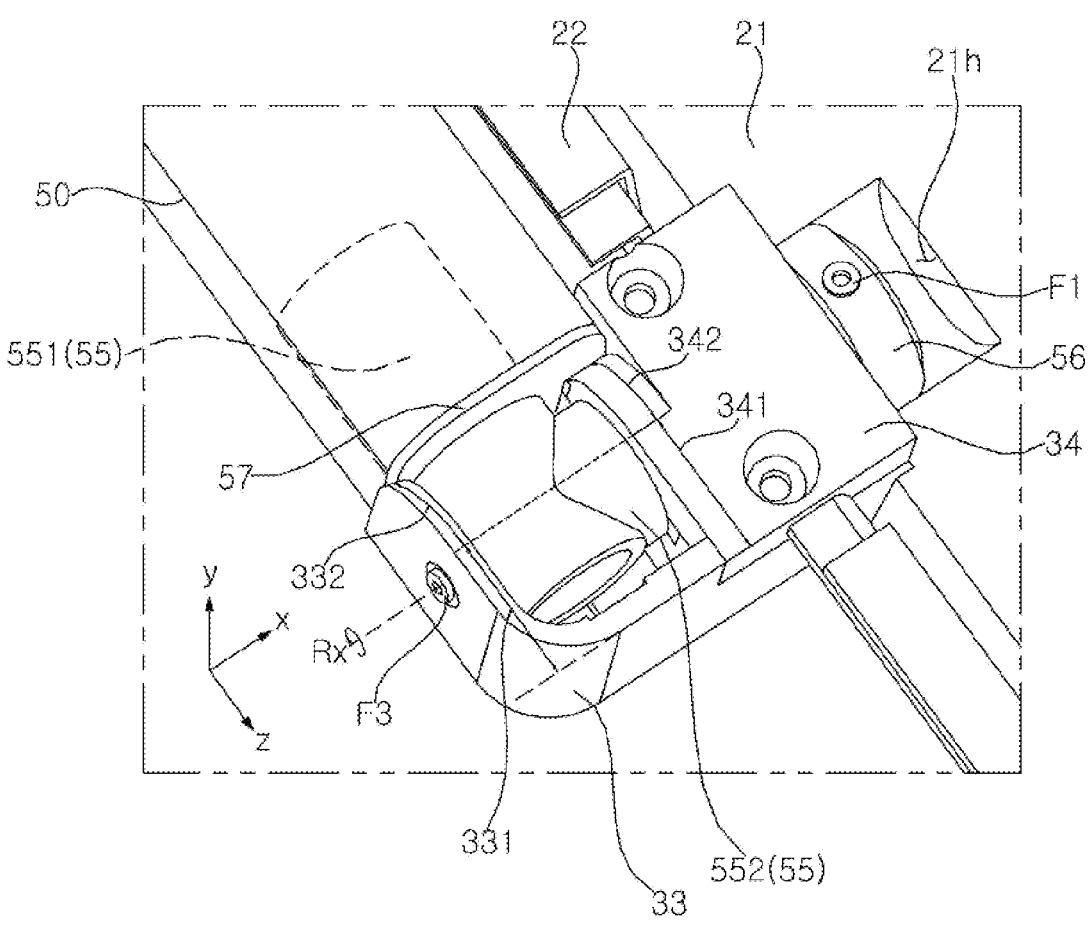

[FIG. 7]
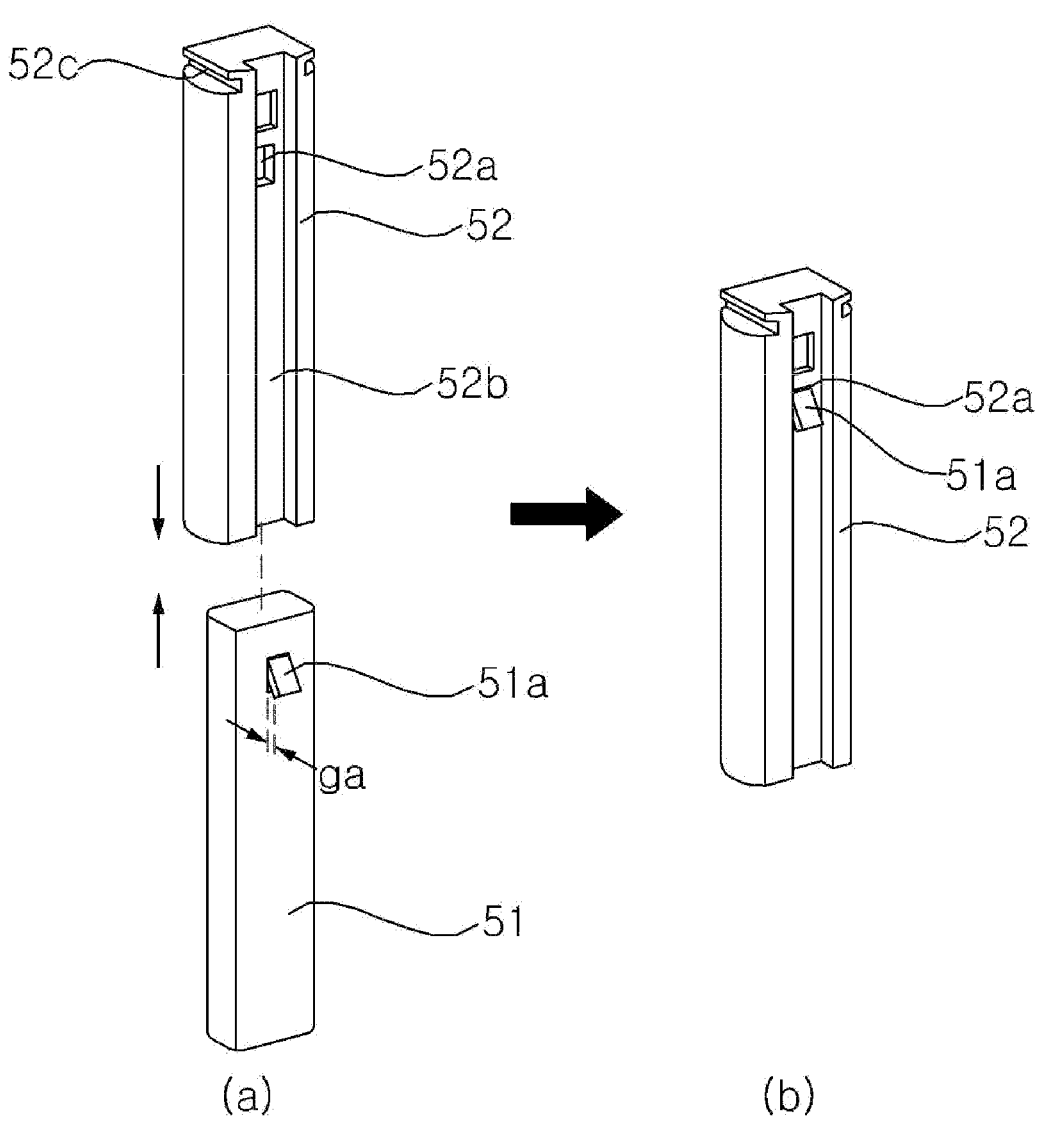
(a)                                         (b)

[FIG. 8]
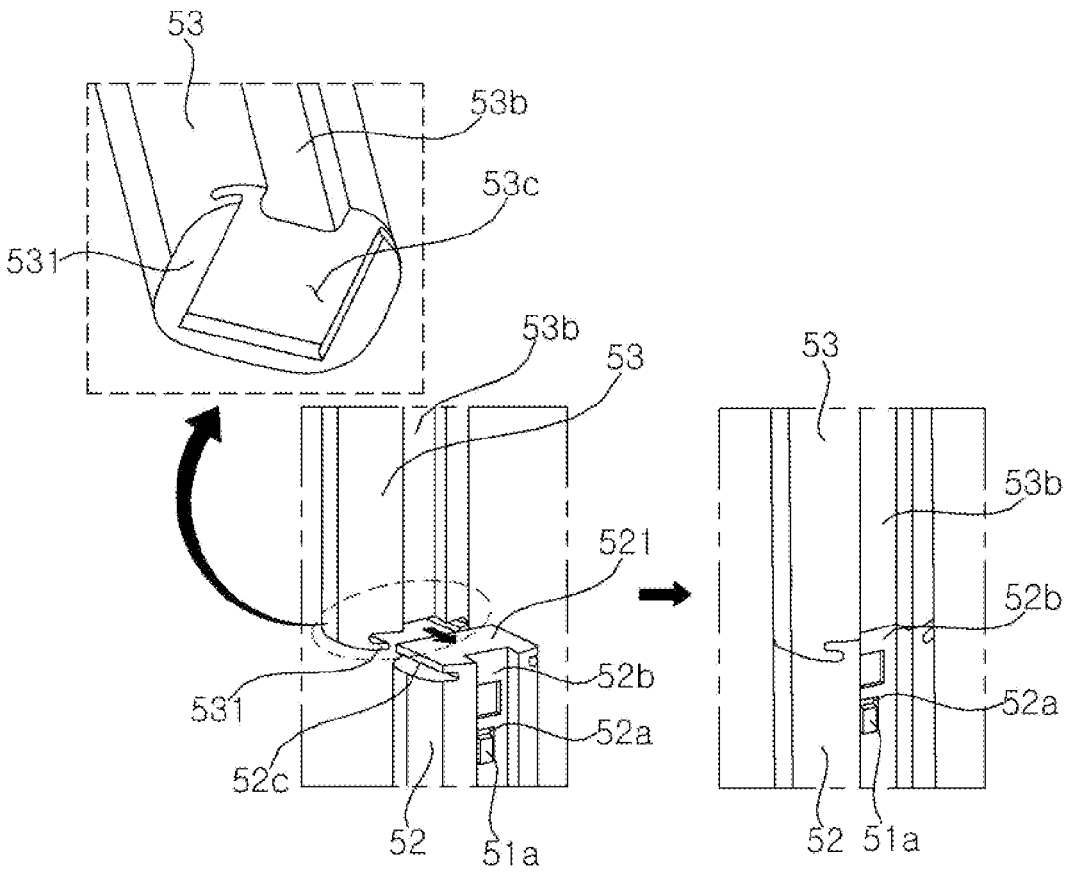

[FIG. 9]
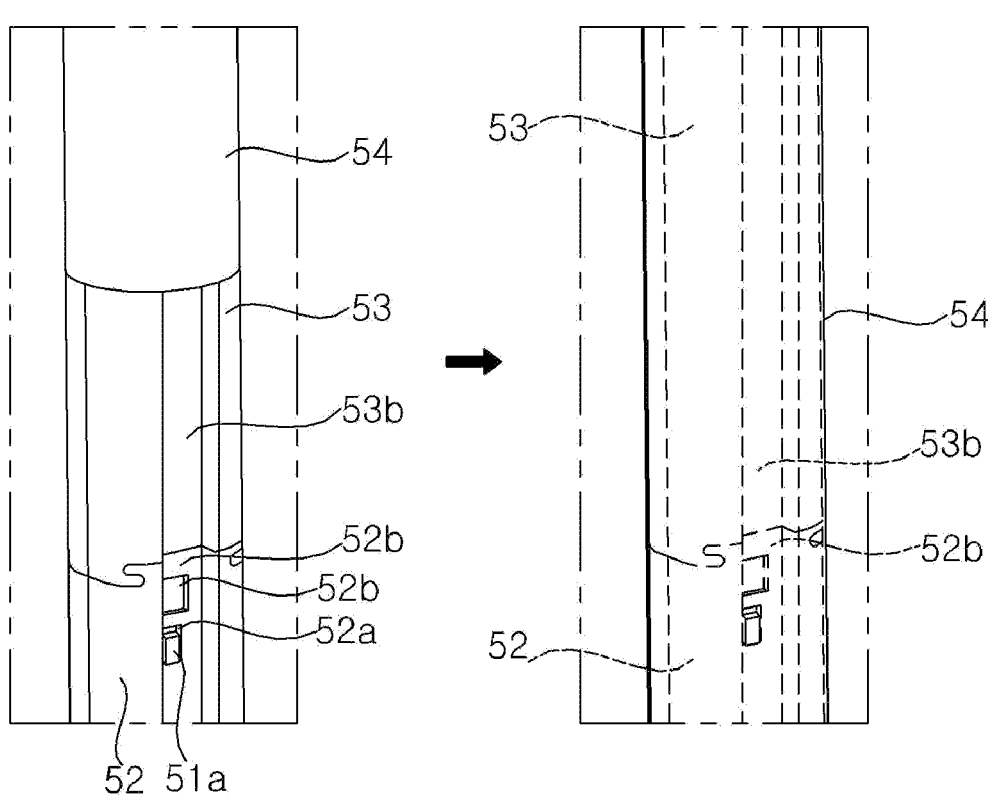

MOBILE TERMINAL

This application is the National Stage filing under 35 U.S.C. 371 of International Application No. PCT/KR2020/015700, filed on Nov. 10, 2020, the contents of which are all incorporated by reference herein in their entirety.

TECHNICAL FIELD

The present disclosure relates to a display device.

BACKGROUND ART

With the development of the information society, there have been growing demands for various types of display devices, and in order to meet these demands, various display devices, such as a liquid crystal display (LCD) device, a plasma display panel (PDP), an electroluminescent display (ELD), a vacuum fluorescent display (VFD), an organic light emitting diode (OLED), etc., have been studied and used recently.

Among them, the LCD panel includes a TFT substrate and a color substrate which are positioned opposite each other with a liquid crystal layer interposed therebetween, and displays images by using light emitted from a backlight unit. Further, the OLED panel may display images by using a self light-emitting organic layer deposited on a substrate on which transparent electrodes are formed.

Recently, a structure of a stand for a display device and a structure for adjusting a rotation angle of the stand are being actively researched.

DISCLOSURE OF INVENTION

Technical Problem

It is an objective of the present disclosure to solve the above and other problems.

It is another objective of the present disclosure to provide a display device capable of adjusting a rotation angle of a stand supporting a display.

It is further another objective of the present disclosure to provide a display device capable of allowing or limiting rotation of a stand according to a user's need.

It is yet another objective of the present disclosure to provide a display device in which a cable may be stably placed in a rotatable stand.

It is yet another objective of the present disclosure to provide a stand capable of reducing electromagnetic waves from a battery.

It is yet another objective of the present disclosure to improve torsional stiffness and/or bending stiffness.

Solution to Problem

According to an embodiment of the present disclosure in order to achieve the above objectives, there is provided a display device including: a display panel; a frame to which the display panel is coupled; a stand coupled to the frame and extending long; a base spaced apart from the display panel in a longitudinal direction of the stand; and a bracket which is fixed to the base and to which the stand is rotatably coupled, wherein the stand includes a shaft fixed to the stand and rotatably coupled to the bracket, the shaft providing an axis of rotation for the stand, wherein the shaft is hollow.

Advantageous Effects of Invention

The display device according to the present disclosure has the following effects.

According to at least one of the embodiments of the present disclosure, a display device capable of adjusting a rotation angle of a stand supporting a display may be provided.

According to at least one of the embodiments of the present disclosure, a display device capable of allowing or limiting rotation of a stand according to a user's need may be provided.

According to at least one of the embodiments of the present disclosure, a display device may be provided in which a cable may be stably placed in a rotatable stand.

According to at least one of the embodiments of the present disclosure, a stand capable of reducing electromagnetic waves from a battery may be provided.

According to at least one of the embodiments of the present disclosure, torsional stiffness and/or bending stiffness may be improved.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

BRIEF DESCRIPTION OF DRAWINGS

FIGS. 1 to 9 are diagrams illustrating examples of a display device according to embodiments of the present disclosure.

MODE FOR THE INVENTION

Hereinafter, the present disclosure will be described in detail with reference to the accompanying drawings, in which the same reference numerals are used throughout the drawings to designate the same or similar components, and a redundant description thereof will be omitted.

The suffixes, such as "module" and "unit," for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A singular representation may include a plural representation unless context clearly indicates otherwise.

In the following description, even if an embodiment is described with reference to a specific figure, reference numeral not appearing in the specific figure may be referred to if necessary, and reference numeral not appearing in the specific figure is used when the reference numeral appears in the other figures.

Referring to FIG. 1, a display device 1 may include a display 10. The display may display images.

The display 10 may include a first long side LS1, a second long side LS2 opposite to the first long side LS1, a first short side SS1 adjacent to the first long side LS1 and the second long side LS2, and a second short side SS2 opposite to the first short side SS1. For convenience of explanation, it is illustrated and described that the first and second long sides LS1 and LS2 are longer than the first and second short sides SS1 and SS2, but it is also possible that lengths of the first and second long sides LS1 and LS2 may be approximately equal to lengths of the first and second short sides SS1 and SS2.

A direction parallel to the long sides LS1 and LS2 of the display 10 may be referred to as a left-right direction LR. A direction parallel to the short sides SS1 and SS2 of the display 10 may be referred to as an up-down direction UD. A direction perpendicular to the long sides LS1 and LS2 and the short sides SS1 and SS2 of the display 10 may be referred to as a front-rear direction FR. Here, a side on which the display 10 displays an image may be referred to as a front side, and a side opposite thereto may be referred to as a rear side.

The first long side LS1 may be referred to as an upper side. The second long side LS2 may be referred to as a lower side. The first short side SS1 may be referred to as a left side. The second short side SS2 may be referred to as a right side.

The first long side LS1, the second long side LS2, the first short side SS1, and the second short side SS2 may be referred to as edges of the display 10. Further, positions where the first long side LS1, the second long side LS2, the first short side SS1, and the second short side SS2 meet each other may be referred to as corners.

For example, a position where the first long side LS1 and the first short side SS1 meet each other may be referred to as a first corner C1. A position where the first short side SS1 and the second long side LS2 meet each other may be referred to as a second corner C2. A position where the second long side LS2 and the second short side SS2 meet each other may be referred to as a third corner C3. A position where the second short side SS2 and the first long side LS1 meet each other may be referred to as a fourth corner C4.

Referring to FIGS. 1 and 2, the display 10 may include a display panel 11, a frame 12, a main frame 13, and a back cover 14. In this case, the display panel 11 may be an OLED panel. In this case, the display 10 does not require a backlight unit, and thus may be made ultrathin. However, the display panel 11 is not limited thereto and may be an LCD panel and the like.

The display panel 11 may form a front surface of the display 10 and may display images on the front. The display panel 11 may divide an image into a plurality of pixels and may output the image while controlling color, brightness, and chroma of the respective pixels. The display panel 11 may be divided into an active area, in which the image is displayed, and a de-active area in which the image is not displayed. The display panel 11 may generate light corresponding to red, green, or blue color in response to a control signal.

The frame 12 may form a side surface of the display 10. The frame 12 may be disposed at the rear of the display panel 11, and the display panel 11 may be coupled to the frame 12. The frame 12 may extend along the edges of the display panel 11. For example, the frame 12 may include a metal material. For example, the frame 12 may include aluminum (Al). Accordingly, the frame 12 may improve torsional stiffness and/or bending stiffness. Meanwhile, the frame 12 may be referred to as a side frame, a middle frame, a middle cabinet, or a panel guide.

The main frame 12 may be coupled to the frame 12 at the rear of the frame 12. A Printed Circuit Board (PCB), on which a plurality of electronic elements are mounted, may be mounted on the main frame 13. Meanwhile, the main frame 13 may be referred to as an inner frame or a module cover.

The back cover 14 may be coupled to the main frame 13 at the rear of the main frame 13. The back cover 14 may form a rear surface of the display 10. For example, the back cover 14 may be an injection-molded product of a resin material. However, the back cover 14 may also include a metal material.

Referring to FIGS. 1 and 3, the display device 1 may include bases 20 and 40 and a stand 50, in addition to the display 10.

The bases 20 and 40 may form a lower end of the display device 1. The bases 20 and 40 may be placed on the floor of a room and the like, to serve as a pedestal for the display device 1. For example, the bases 20 and 40 may be a substantially flat block and formed in the shape of a block with rounded corners. The bases 20 and 40 may include a lower base 20 forming a lower surface of the bases 20 and 40, and an upper base 40 forming an upper surface of the bases 20 and 30. The upper base 40 may be detachably coupled to the lower base 20 on the upper side of the lower base 20, which will be described in further detail below.

The stand 50 may be elongated. The stand 50 may be rotatably coupled to the bases 20 and 40 at a lower end of the stand 50 or at a position adjacent thereto. In this case, an axis of rotation of the stand 50 may be parallel to the left-right direction. The stand 50 may be referred to as a pole.

In a first state of the stand 50, a longitudinal direction of the stand 50 may be parallel to the up-down direction (see FIGS. 1 and 5). In a second state of the stand the longitudinal direction of the stand 50 may be parallel to the front-rear direction (see FIGS. 3 and 6). That is, while rotating about the axis of rotation that is parallel to the left-right direction, the stand 50 may be positioned in the first state and the second state, as well as therebetween.

The display 10 may be coupled to the stand 50 at an upper end of the stand or at a position adjacent thereto. The display 10 may be spaced apart from the bases 20 and 40 in the longitudinal direction of the stand 50. For example, one side of the frame 12 of the display 10 may be coupled to the stand 50.

The display 10 may be rotatably coupled to the stand 50. For example, the display 10 may rotate and pivot about the axis of rotation that is parallel to the front-rear direction (see FIGS. 1 and 3). In another example, the display 10 may be tilted while rotating about the axis of rotation that is parallel to the left-right direction (not shown).

Meanwhile, a shelf 60 may be mounted to the stand 50. For example, the shelf 60 may be coupled to the stand 50 at a position between the display 10 and the bases 20 and 40. The shelf 60 may have a substantially plate shape, such that a user may place an external device, such as a smartphone, on the shelf 60. For example, the shelf 60 may be a wireless charger for wireless charging of the smartphone placed on the shelf 60. In this case, the shelf 60 may be electrically connected to a power source of the display device 1 to receive power therefrom. In addition, the shelf 60 may be coupled to the stand 50 so as to be rotatable about the axis of rotation that is parallel to the left-right direction.

Referring to FIGS. 4 and 5, the lower base 20 may include a lower body 21 and a lower wall 22. The lower body 21 may have a substantially flat shape and may form a lower end of the lower body 21. The lower wall 22 may extend upward from a side surface of the lower body 21, and may extend along a circumference of the lower body 21. In this case, the upper base 40 (see FIG. 1) may be detachably coupled to the lower wall 22 to cover the lower base 20. To this end, a fastening member, such as a screw, may pass through the upper base 40 to be fastened to a hole 22a formed in the lower wall 22.

A bracket 30 may be fixed to the lower base 20, and the stand 50 may be rotatably coupled to the bracket 30. For example, the bracket 30 may be provided on a right surface of the lower base 20. The bracket 30 may include lower brackets 31, 32, and 33, and an upper bracket 34.

The lower brackets 31, 32, and 33 may be elongated in the left-right direction and may pass through the lower wall 22 on the right surface of the lower base 20 to be fixed to the lower body 21. In this case, some of the lower brackets 31, 32, and 33 may protrude rightward from the right surface of the lower base 20. The lower brackets 31, 32, and 33 may include a first body 31, a second body 32, and a third body 33.

The first body 31 may form a left end of the lower brackets 31, 32, and 33. The first body 31 may be inserted into the lower body 21. The second body 32 may be disposed between the left end and a right end of the lower brackets 31, 32, and 33. The second body 32 may pass through the lower wall 22. The third body 33 may form the right end of the lower brackets 31, 32, and 33. The third body 33 may be disposed outside the lower wall 33.

The upper bracket 34 may be detachably coupled to the lower brackets 31, 32, and 33 on an upper side of the lower brackets 31, 32, and 33. For example, the upper bracket 34 may be removably coupled to the lower brackets 31, 32, and 33 by a fastening member such as a screw. Further, the second body 32 may include a coupling part 321 having a hole 321a to which the fastening member is fastened. In this case, when the fastening member is fastened to the hole 321a of the coupling part 321 by passing through holes 34a and 34b of the upper bracket 34, the upper bracket 34 may be coupled to the second body 32.

Meanwhile, a shaft 55 may be fixed to the stand 50 and may be rotatably coupled to the aforementioned bracket 30. The shaft 55 may be hollow. The shaft may include a first part 551 and a second part 552. For example, the first part 551 and the second part 552 may have a cylindrical shape.

The first part 551 may extend in the longitudinal direction of the stand 50 and may be fixed to the stand 50. For example, an end of the first part 551 may pass through an end of the stand 50 to be inserted into the stand 50. The first part 551 may rotate together with the stand 50. In this case, the first part 551 may be hollow.

Further, the first part 551 may at least partially overlap the third body 33 in the up-down direction. That is, at least a portion of the first part 551 may be disposed on the third body 33. For example, the third body 33 may be open at a top end and a bottom end, and a portion of the first part 551 may be disposed inside the third body 33 through an opening of the third body 33.

The second part 552 may extend from the first part 551 in a direction intersecting the longitudinal direction of the stand 50. For example, the second part 552 may be elongated leftward from a side surface of the first part 551. In this case, the second part 552 may be hollow. A hollow space 55p of the second part 552 may communicate with a hollow space 55q of the first part 551.

In addition, a central axis Rx of the second part 552 may be located coaxially with the axis of rotation of the stand 50. That is, when the second part 552 rotates about the central axis Rx, the first part 551 and the stand 50 may also rotate together. The central axis Rx may be parallel to the left-right direction.

Further, the second part 552 may be disposed between the second body 32 and the upper bracket 34. In this case, the second body 32 may rotatably support the second part 552. For example, when the upper bracket 34 is coupled to the second body 32, a space, having the same size as the outer shape of a portion of the second part 552, may be formed between the upper bracket 34 and the second body 32. That is, when the second part 552 is inserted into the space, the second part 552 may contact the second body 32 and the upper bracket 34, such that back-and-forth movement and/or up-and-down movement of the second part 552 may be limited.

A ring 56 may be disposed on the first body 31. The ring 56 may be coupled to an outer surface of the second part 552. An inner diameter of the ring 56 may be equal to or greater than an outer diameter of the second part 552. In this case, the ring 56 may partially surround the outer surface of the second part 525. For example, the ring 56 may be coupled to the second part 552 in such a manner that fastening members F1 and F2 pass through a hole 56a, formed in the ring 56, to be fastened to a hole (not numbered) formed in the second part 552.

In this case, the first body 31 may be recessed downward from the second body 32 to form a step 32a. In this case, when the ring 56 is coupled to the second part 552, a right side of the ring 56 may be seated on the step 32a, such that rightward movement of the second part 552 may be limited. Further, the first body 31 may have the same curvature as the outer surface of the ring 56 and may have a surface contacting the outer surface of the ring 56. In this manner, the first body 31 may rotatably support the ring 56.

Accordingly, by a force applied to the stand 50 by a user and the like, the stand 50 may rotate about the central axis Rx that is parallel to the left-right direction.

Meanwhile, a cable C (not shown) may be disposed in a hollow space of the shaft 55, i.e., the hollow space 55q of the first part 551 and the hollow space 55p of the second part 552. Accordingly, even when the stand 50 rotates together with the shaft 55, the cable C may be stably disposed in the shaft 55 without being twisted therein.

The cable C may be electrically connected to electronic components, mounted in the bases 20 and 40, and to the display panel 11 (see FIG. 1). For example, the cable C connected to electronic components, such as HDMI, USB, controller, or battery that are mounted in the lower base 20, may be guided to the shaft 55 through a cable hole 21h (see FIG. 6) formed in the lower base 20. Further, the cable C may be guided to the stand 50 or an inner space of the stand 50 by passing through the hollow space 55p of the second part 552 and the hollow space 55q of the first part 551. Further, the cable C may pass through the stand 50 to be connected to the display panel 11, and thus may be electrically connected to the electronic components, such as the controller or battery which are mounted in the lower base 20, through the cable C.

Referring to FIGS. 4 and 6, the third body 33 may have a hole 33*a* formed by passing through a right surface of the third body 33 in the left-right direction. Further, the first part 551 may have a shaft hole (not shown) formed at a position facing the hole 33*a*.

In this case, a fastening member F3, such as a screw, may pass through the hole 33*a* to be fastened to the shaft hole or may be detached from the shaft hole. When the fastening member F3 is detached from the shaft hole, the stand 50 and the shaft 55 may rotate freely. When the fastening member F3 is fastened to the shaft hole, rotation of the stand 50 and the shaft 55 may become stiff or may be restricted depending on fastening strength or fastening length.

That is, when the fastening member F3 is fastened to the shaft hole with a relatively low fastening strength, a relatively greater force may be required for rotating the stand 50 and the shaft 55 compared to the case where the fastening member F3 is not fastened to the shaft hole. Further, when the fastening member F3 is fastened to the shaft hole with a maximum fastening strength, the rotation of the stand 50 and the shaft 55 may be restricted.

Accordingly, a user may rotate the stand 50 to a desired angle by detaching the fastening member F3 from the shaft hole or by fastening the fastening member F3 to the shaft hole with a relatively low fastening strength. In addition, the user may maintain an angle of the stand 50 by fastening the fastening member F3 to the shaft hole with a maximum fastening strength.

Meanwhile, a washer 57 may be disposed at an end of the stand 50, and the first part 551 may pass through the washer 57. The washer 57 may be disposed between the end of the stand 50 and the third body 33. While being in contact with the end of the stand 50, the washer 57 may contact the third body 33 and the upper bracket 34. In this case, a right surface of the upper bracket 34 may be spaced leftwardly from a right surface of the third body 33.

In addition, the third body 33 may include a first curved surface 332 located on a trajectory of the washer 57 and capable of contacting the washer 57. The first curved surface 332 may be a surface having a first radius of curvature relative to a center located on the inside of the right surface of the third body 33. The first curved surface 332 may form a corner at which a rear side and an upper side of the right surface of the third body 33 meet each other. The third body 33 may include a first flat surface 331 extending forward from an upper end of the first curved surface 332 and capable of contacting the washer 57. The first flat surface 331 may form the upper side of the right surface of the third body 33.

In addition, the upper bracket 34 may include a second curved surface 342 located on a trajectory of the washer 57 and capable of contacting the washer 57. The second curved surface 342 may be a surface having a second radius of curvature, which is equal to the first radius of curvature, relative to a center located on the inside of the right surface of the upper bracket 34. That is, the second curved surface 342 may have the same curvature as the first curved surface 332. The second curved surface 342 may form a corner at which a rear side and an upper side of the right surface of the upper bracket 34 meet each other. The second curved surface 342 may be spaced leftwardly from the first curved surface 332. The upper bracket 34 may include a second flat surface 341 extending forward from an upper end of the second curved surface 342 and capable of contacting the washer 57. The second flat surface 341 may form the upper side of the right surface of the upper bracket 34. The second flat surface 341 may be spaced leftwardly from the first flat surface 331.

Accordingly, while being in contact with the first curved surface 332 and the second curved surface 342, the washer 57 may rotate about the central axis Rx together with the stand 50 and the shaft 55. Further, when the washer 57 contacts the first flat surface 331 and the second flat surface 341, rotation in a direction opposite a rotation direction toward the first curved surface 332 and the second curved surface 342 may be restricted.

In addition, the third body 33 may further include a first vertical surface (not numbered) extending downward from a lower end of the first curved surface 332 and capable of contacting the washer 57. The upper bracket 34 may further include a second vertical surface (not numbered) extending downward from a lower end of the second curved surface 342 and capable of contacting the washer 57. In this case, when the washer 57 contacts the first vertical surface and the second vertical surface, rotation in a direction opposite a rotation direction toward the first curved surface 332 and the second curved surface 342 may be restricted.

Meanwhile, the washer 57 may be made of a material different from a material of the stand 50, the third body 33, and the upper bracket 34 that contact the washer 57. For example, the washer 57 may include a plastic material. Accordingly, the washer 57 may minimize the occurrence of noise or damage to the stand 50 and/or the bracket 30 which is caused by the rotation of the stand 50.

Referring to FIG. 7, the stand 50 may include a battery 51 and a supporter 52. The battery 51 is a secondary battery capable of being charged and discharged and may be detachably coupled to the supporter 52.

The battery 51 may be elongated in the up-down direction. The battery 51 may include a hook 51*a* protruding from an outer surface of the battery 51 and having a lower end spaced apart from the outer surface of the battery 51 by a predetermined gap ga. For example, the hook 51*a* may be adjacent to an upper end of the battery 51.

The supporter 52 may be elongated in the up-down direction. The supporter 52 may provide an internal space into which the battery 51 is inserted. The supporter 52 may have a supporter hole 52*a* formed by passing through the supporter 52 in the front-rear direction. In this case, when the battery 51 is inserted into the supporter 52, the hook 51*a* may be elastically deformed by contact with an inner surface of the supporter 52, such that the gap ga may be reduced. Further, the hook 51*a* may be elastically restored while passing through the support hole 52*a*, to be engaged with the supporter hole 52*a*. Further, a user may detach the hook 51*a* from the supporter hole 52*a* by pressing the hook 51*a*, engaged with the supporter hole 52*a*, toward the inside of the battery 51.

Accordingly, the battery 51 may be detachably coupled to the supporter 52 by the aforementioned hook coupling. For example, the supporter 52 may include a metal material such as aluminum (Al). In this case, the supporter 52 may reduce static electricity and Electromagnetic Interference (EMI) noise of the battery.

Meanwhile, the supporter 52 may include a first groove 52*b* recessed from an outer surface of the supporter 52. The first groove 52*b* may be elongated in the up-down direction. For example, the supporter hole 52*a* may be formed in the first groove 52*b*. The aforementioned cable C (not shown) may be disposed in the first groove 52*b*. That is, the cable C disposed in the hollow space of the shaft 55 may be stably disposed in the first groove 52*b*.

Referring to FIG. 8, the stand 50 may include an inner body 53 detachably coupled to the supporter 52. The inner body 53 may be elongated in the up-down direction. The inner body 53 may be disposed parallel to the supporter 52 in the up-down direction.

The supporter 52 may include a first slot 52*c* and a first coupling part 521. The first slot 52*c* may be recessed from the outer surface of the supporter 52 and may extend along a circumference of the supporter 52. The first coupling part 521 may form a top surface of the supporter 52 and may define a portion of a boundary of the first slot 52*c*. That is, the first slot 52*c* may be formed in a lower side of the first coupling part 521.

The inner body 53 may include a second slot 53*c* and a second coupling part 531. The second slot 53*c* may be recessed rearwardly from a front surface of the inner body 53, and the first coupling part 521 may be inserted into the second slot 53*c*. That is, the second slot 53*c* may be formed in a shape corresponding to an outer shape of the first coupling part 521. The second coupling part 531 may form a bottom surface of the inner body 53 and may define a portion of a boundary of the second slot 53*c*. That is, the second slot 53*c* may be formed in a lower side of the second coupling part 531. The second coupling part 531 may be inserted into the first slot 52*c*. That is, the aforementioned first slot 52*c* may be formed in a shape corresponding to an outer shape of the second coupling part 531.

Accordingly, the inner body 53 may be detachably coupled to the supporter 52 by slide coupling on top of the supporter 52. For example, the inner body 53 may include a metal material such as aluminum (Al). In this case, torsional stiffness and/or bending stiffness of the stand 50 may be improved.

Meanwhile, the inner body 53 may include a second groove 53*b* recessed from the outer surface of the supporter 52. The second groove 53*b* may be elongated in the up-down direction. For example, the second groove 53*b* may be disposed parallel to the first groove 52*b*. The aforementioned cable C (not shown) may be disposed in the second groove 53*b*. That is, the cable C disposed in the hollow space of the shaft and in the first groove 52*b* may be stably disposed in the second groove 53*b*.

Referring to FIG. 9, the stand 50 may include an outer body 54 covering the inner body 53 and the outer surface of the supporter 52. The outer body 54 may be elongated in the up-down direction. The outer body 54 may define an internal receiving space into which the inner body 53 and the supporter 52 are inserted. The outer body 54 may form the exterior of the stand 50.

When the outer body 54 covers the inner body 53 and the outer surface of the supporter 52, the first groove 52*b* and the second groove 53*b* may be spaced apart from an inner surface of the outer body 54. That is, the cable C (not shown) may be disposed between the first groove 52*b* and the inner surface of the outer body 54 and between the second groove 53*b* and the inner surface of the outer body 54.

According to an embodiment of the present disclosure, there is provided a display device including: a display panel; a frame to which the display panel is coupled; a stand coupled to the frame and extending long; a base spaced apart from the display panel in a longitudinal direction of the stand; and a bracket which is fixed to the base and to which the stand is rotatably coupled, wherein the stand includes a shaft fixed to the stand and rotatably coupled to the bracket, the shaft providing an axis of rotation for the stand, wherein the shaft is hollow.

In addition, according to another embodiment of the present disclosure, the display device may further include: a cable disposed in a hollow space of the shaft; and electronic components mounted in the base, wherein the cable may be electrically connected to the electronic components and the display panel.

In addition, according to another embodiment of the present disclosure, the shaft may further include: a first part extending in the longitudinal direction of the stand and fixed to the stand; and a second part extending from the first part in a direction intersecting the longitudinal direction of the stand and providing an axis of rotation for the stand, wherein the first part and the second part may be hollow.

In addition, according to another embodiment of the present disclosure, the bracket may further include: a lower bracket extending in a longitudinal direction of the second part and fixed to the base; and an upper bracket coupled to the lower bracket at a top of the lower bracket, wherein the second part may be disposed between the lower bracket and the upper bracket.

In addition, according to another embodiment of the present disclosure, the lower bracket may further include: a first body forming one end of the lower bracket; a second body disposed between the one end and the other end of the lower bracket and rotatably supporting the second part; and a third body forming the other end of the lower bracket and at least partially overlapping the first part in an up-down direction.

In addition, according to another embodiment of the present disclosure, the first body may be recessed downward from the second body to form a step, wherein the stand may further include a ring disposed on the first body and coupled to an outer surface of the second part, the ring seated on the step.

In addition, according to another embodiment of the present disclosure, the first body may have a surface having a same curvature as an outer surface of the ring and contacting the outer surface of the ring.

In addition, according to another embodiment of the present disclosure, the third body may have a hole formed by passing through the third body in a longitudinal direction of the lower bracket, wherein the first part may include a shaft hole formed at a position facing the hole, wherein the stand may further include a fastening member which is fastened to the shaft hole by passing through the hole to limit rotation of the stand, or which is detached from the shaft hole to allow the rotation of the stand.

In addition, according to another embodiment of the present disclosure, the stand may further include a washer which is disposed at an end of the stand and through which the first part passes, wherein the washer may contact the third body and the upper bracket and may be made of a material different from a material of the stand and the bracket.

In addition, according to another embodiment of the present disclosure, the third body may further include: a first curved surface disposed on a trajectory of the washer and capable of contacting the washer; and a first flat surface extending from the first curved surface and capable of contacting the washer, wherein the upper bracket may further include: a second curved surface disposed on the trajectory of the washer and capable of contacting the washer, the second curved surface spaced apart from the first curved surface and having a same curvature as the first curved surface; and a second flat surface extending from the second curved surface and capable of contacting the washer, the second flat surface spaced apart from the first flat surface.

In addition, according to another embodiment of the present disclosure, the display device may further include a cable disposed in the hollow space of the shaft, wherein the stand may further include: a battery; and a supporter into which the battery is detachably inserted and which includes a metal material, wherein the supporter may include a first groove which is recessed from an outer surface of the supporter and in which the cable is disposed.

In addition, according to another embodiment of the present disclosure, the battery may further include a hook protruding from an outer surface of the battery and being elastically deformed by contact with an inner surface of the supporter, wherein the supporter may have a supporter hole which is formed through the supporter and with which the hook is engaged.

In addition, according to another embodiment of the present disclosure, the stand may further include an inner body extending long and detachably coupled to the supporter, the inner body disposed parallel to the supporter in a longitudinal direction of the inner body, wherein the inner body may include a second groove which is recessed from an outer surface of the inner body and disposed parallel to the first groove, and in which the cable is disposed.

In addition, according to another embodiment of the present disclosure, the supporter may further include: a first slot recessed from the outer surface of the supporter and extending along a perimeter of the supporter; and a first coupling part forming a top surface of the supporter and defining a portion of a boundary of the first slot, wherein the inner body may further include: a second slot which is recessed rearwardly from a front surface of the inner body and into which the first coupling part is inserted; and a second coupling part forming a bottom surface of the inner body, forming a portion of a boundary of the second slot, and capable of being inserted into the first slot.

In addition, according to another embodiment of the present disclosure, the stand may further include an outer body covering the inner body and the outer surface of the supporter, wherein the first groove and the second groove may be spaced apart from an inner surface of the outer body.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a display panel;
a frame to which the display panel is coupled;
a stand extending long and having one end coupled to the frame;
a base adjacent to the other end of the stand;
a shaft protruding from the other end of the stand and rotatably coupled to a lateral side of the base with the stand about an axis intersecting the lateral side of the base;
electronic components mounted in the base; and
a cable electrically connected to the electronic components and the display panel,
wherein the shaft is hollow,
wherein the cable is disposed in a hollow space of the shaft.

2. The display device of claim 1, further comprising a bracket which protrudes from the lateral side of the base and on which the shaft is seated.

3. The display device of claim 2, wherein the shaft comprises:
a first part extending in a longitudinal direction of the stand and fixed to the stand; and
a second part extending from the first part in a direction intersecting the longitudinal direction of the stand and providing an axis of rotation for the shaft,
wherein the first part and the second part are hollow.

4. A display device comprising:
a display panel;
a frame to which the display panel is coupled;
a stand extending long and having one end coupled to the frame;
a base adjacent to the other end of the stand;
a shaft protruding from the other end of the stand and rotatably coupled to a lateral side of the base with the stand about an axis intersecting the lateral side of the base; and
a bracket which protrudes from the lateral side of the base and on which the shaft is seated,
wherein the shaft comprises:
a first part extending in a longitudinal direction of the stand and fixed to the stand; and
a second part extending from the first part in a direction intersecting the longitudinal direction of the stand and providing an axis of rotation for the shaft,
wherein the first part and the second part are hollow,
wherein the bracket comprises:
a lower bracket extending in a longitudinal direction of the second part and fixed to the base; and
an upper bracket coupled to the lower bracket at a top of the lower bracket,
wherein the second part is disposed between the lower bracket and the upper bracket,
wherein the lower bracket comprises:
a first body forming one end of the lower bracket;
a second body disposed between the one end and the other end of the lower bracket and rotatably supporting the second part; and
a third body forming the other end of the lower bracket and at least partially overlapping the first part in an up-down direction.

5. The display device of claim 4, wherein the first body is recessed downward from the second body to form a step, wherein the stand further comprises a ring disposed on the first body and coupled to an outer surface of the second part, the ring seated on the step.

6. The display device of claim 5, wherein the first body has a surface having a same curvature as an outer surface of the ring and contacting the outer surface of the ring.

7. The display device of claim 4, wherein the third body has a hole formed by passing through the third body in a longitudinal direction of the lower bracket, wherein the first part comprises a shaft hole formed at a position facing the hole, wherein the stand further comprises a fastening member which is fastened to the shaft hole by passing through the hole to limit rotation of the stand, or which is detached from the shaft hole to allow the rotation of the stand.

8. The display device of claim 4, wherein the stand further comprises:

a washer which is disposed at an end of the stand and through which the first part passes, wherein the washer contacts the third body and the upper bracket and is made of a material different from a material of the stand and the bracket.

9. The display device of claim 8, wherein the third body further comprises:

a first curved surface disposed on a trajectory of the washer and capable of contacting the washer; and a first flat surface extending from the first curved surface and capable of contacting the washer, wherein the upper bracket further comprises:

a second curved surface disposed on the trajectory of the washer and capable of contacting the washer, the second curved surface spaced apart from the first curved surface and having a same curvature as the first curved surface; and a second flat surface extending from the second curved surface and capable of contacting the washer, the second flat surface spaced apart from the first flat surface.

10. A display device comprising:

a display panel;

a frame to which the display panel is coupled;

a stand extending long and having one end coupled to the frame;

a base adjacent to the other end of the stand;

a shaft protruding from the other end of the stand and rotatably coupled to a lateral side of the base with the stand about an axis intersecting the lateral side of the base; and a cable disposed in a hollow space of the shaft, wherein the stand further comprises:

a battery; and a supporter into which the battery is detachably inserted and which includes a metal material, and wherein the supporter comprises a first groove which is recessed from an outer surface of the supporter and in which the cable is disposed.

11. The display device of claim 10, wherein the battery further comprises a hook protruding from an outer surface of the battery and being elastically deformed by contact with an inner surface of the supporter, wherein the supporter has a supporter hole which is formed through the supporter and with which the hook is engaged.

12. The display device of claim 10, wherein the stand further comprises an inner body extending long and detachably coupled to the supporter, the inner body disposed parallel to the supporter in a longitudinal direction of the inner body, wherein the inner body comprises a second groove which is recessed from an outer surface of the inner body and disposed parallel to the first groove, and in which the cable is disposed.

13. The display device of claim 12, wherein the supporter further comprises:

a first slot recessed from the outer surface of the supporter and extending along a perimeter of the supporter; and a first coupling part forming a top surface of the supporter and defining a portion of a boundary of the first slot, wherein the inner body further comprises:

a second slot which is recessed rearwardly from a front surface of the inner body and into which the first coupling part is inserted; and a second coupling part forming a bottom surface of the inner body, forming a portion of a boundary of the second slot, and capable of being inserted into the first slot.

14. The display device of claim 12, wherein the stand further comprises an outer body covering the inner body and the outer surface of the supporter, wherein the first groove and the second groove are spaced apart from an inner surface of the outer body.

* * * * *